(12) United States Patent
Hebrink et al.

(10) Patent No.: US 12,738,628 B2
(45) Date of Patent: Sep. 15, 2026

(54) PASSIVE RADIATIVE COOLING FILM FOR ANTENNAS

(71) Applicant: 3M INNOVATIVE PROPERTIES COMPANY, St. Paul, MN (US)

(72) Inventors: Timothy J. Hebrink, Scandia, MN (US); Pontus S.B. Broddner, Sundbyberg (SE); John P. Baetzold, North St. Paul, MN (US); Derek J. Dehn, Maplewood, MN (US); Charles A. Hill, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/850,179

(22) PCT Filed: Apr. 18, 2023

(86) PCT No.: PCT/IB2023/053968

§ 371 (c)(1),
(2) Date: Sep. 24, 2024

(87) PCT Pub. No.: WO2023/203489

PCT Pub. Date: Oct. 26, 2023

(65) Prior Publication Data

US 2025/0118882 A1 Apr. 10, 2025

Related U.S. Application Data

(60) Provisional application No. 63/333,152, filed on Apr. 21, 2022.

(51) Int. Cl.
*H01Q 1/02* (2006.01)
*B32B 3/30* (2006.01)
(Continued)

(52) U.S. Cl.
CPC ................ *H01Q 1/02* (2013.01); *B32B 3/30* (2013.01); *B32B 15/09* (2013.01); *B32B 15/20* (2013.01);
(Continued)

(58) Field of Classification Search
CPC .. H01Q 1/02; B32B 3/30; B32B 15/09; B32B 15/20; B32B 27/08; B32B 27/304;
(Continued)

(56) References Cited

U.S. PATENT DOCUMENTS 3,043,112 A 7/1962 Head
4,726,989 A 2/1988 Mrozinski
(Continued)

FOREIGN PATENT DOCUMENTS

CN 110600852 A 12/2019
CN 114389024 A * 4/2022 ............ H01Q 1/424
(Continued)

OTHER PUBLICATIONS

Bhowmik, "Investigation of Wide Band mm-Wave Radome", Table 2.1, KTH Royal Institute of Technology, 2017, 16 pages (Table of Content and Bibliography).
(Continued)

*Primary Examiner* — Seokjin Kim
(74) *Attorney, Agent, or Firm* — Jonathan V. Sry

(57) ABSTRACT

A cooling film for use in passively cooling an antenna includes an antisoiling layer secured to a first major surface of a reflective microporous layer. The reflective microporous layer comprises a first fluoropolymer and is diffusely reflective of electromagnetic radiation over a majority of wavelengths in the range of 400 to 2500 nanometers. The film can also include an infrared-absorptive layer secured to a second major surface of the film opposite the first major surface, and the infrared-absorptive layer is optionally metallized. The
(Continued)

film is shaped into a self-supporting three-dimensional structure, such as fins, and a thermally conductive material is inside the structure and secured to a portion of the antenna, either the front side of the antenna for the non-metallized film or the back side of the antenna for the metallized film.

6 Claims, 4 Drawing Sheets

(51) Int. Cl.
*B32B 15/09* (2006.01)
*B32B 15/20* (2006.01)
*B32B 27/08* (2006.01)
*B32B 27/30* (2006.01)
*B32B 27/36* (2006.01)

(52) U.S. Cl.
CPC ............ *B32B 27/08* (2013.01); *B32B 27/304* (2013.01); *B32B 27/308* (2013.01); *B32B 27/36* (2013.01); *B32B 2250/05* (2013.01); *B32B 2250/24* (2013.01); *B32B 2255/10* (2013.01); *B32B 2255/205* (2013.01); *B32B 2255/26* (2013.01); *B32B 2270/00* (2013.01); *B32B 2307/416* (2013.01); *B32B 2307/518* (2013.01); *B32B 2307/584* (2013.01)

(58) Field of Classification Search
CPC ... B32B 27/308; B32B 27/36; B32B 2250/05; B32B 2250/24; B32B 2255/10; B32B 2255/205; B32B 2255/26; B32B 2270/00; B32B 2307/416; B32B 2307/518; B32B 2307/584
See application file for complete search history.

(56) References Cited

U.S. PATENT DOCUMENTS

| | | | | |
|---|---|---|---|---|
| 4,874,567 | A | 10/1989 | Lopatin et al. | |
| 4,976,859 | A | 12/1990 | Wechs | |
| 5,238,623 | A | 8/1993 | Mrozinski | |
| 5,993,954 | A | 11/1999 | Radovanovic et al. | |
| 6,045,894 | A | 4/2000 | Jonza et al. | |
| 6,277,485 | B1 | 8/2001 | Invie et al. | |
| 6,368,699 | B1 | 4/2002 | Gilbert et al. | |
| 6,368,742 | B2 | 4/2002 | Fisher et al. | |
| 6,531,230 | B1 | 3/2003 | Weber et al. | |
| 6,632,850 | B2 | 10/2003 | Hughes et al. | |
| 6,667,095 | B2 | 12/2003 | Wheatley et al. | |
| 6,783,349 | B2 | 8/2004 | Neavin et al. | |
| 7,141,297 | B2 | 11/2006 | Condo et al. | |
| 7,271,951 | B2 | 9/2007 | Weber et al. | |
| 7,632,568 | B2 | 12/2009 | Padiyath et al. | |
| 7,952,805 | B2 | 5/2011 | Mcgurran et al. | |
| 8,779,964 | B2 | 7/2014 | Kelsey et al. | |
| 8,962,214 | B2 | 2/2015 | Smith et al. | |
| 9,523,516 | B2 | 12/2016 | Hebrink et al. | |
| 9,670,300 | B2 | 6/2017 | Olson et al. | |
| 9,998,070 | B2 | 6/2018 | O'Neill et al. | |
| 10,072,173 | B2 | 9/2018 | Clear et al. | |
| 10,240,013 | B2 | 3/2019 | Mrozinski et al. | |
| 11,634,613 | B2 | 4/2023 | Hebrink et al. | |
| 11,654,664 | B2 | 5/2023 | Hebrink et al. | |
| 2002/0152755 | A1 | 10/2002 | Johnson et al. | |
| 2005/0233070 | A1 | 10/2005 | Pellerite et al. | |
| 2012/0268344 | A1* | 10/2012 | McCarthy .......... | H01Q 21/0093 343/893 |
| 2015/0175479 | A1 | 6/2015 | Brown et al. | |
| 2016/0298266 | A1 | 10/2016 | Zillig et al. | |
| 2017/0198129 | A1 | 7/2017 | Olson et al. | |
| 2020/0381814 | A1* | 12/2020 | Yetisir .................... | H01Q 1/428 |
| 2022/0355567 | A1 | 11/2022 | Hebrink et al. | |
| 2023/0001676 | A1 | 1/2023 | Hebrink et al. | |
| 2023/0008147 | A1 | 1/2023 | Hebrink et al. | |
| 2023/0213243 | A1 | 7/2023 | Hebrink et al. | |
| 2023/0366642 | A1 | 11/2023 | Hebrink et al. | |

FOREIGN PATENT DOCUMENTS

| | | | | | |
|---|---|---|---|---|---|
| CN | 115084849 | B | * | 9/2024 | ............... H01Q 1/02 |
| WO | 1995017303 | A1 | | 6/1995 | |
| WO | 1999039224 | A1 | | 8/1999 | |
| WO | 2002012404 | A2 | | 2/2002 | |
| WO | 2019130198 | A1 | | 7/2019 | |
| WO | 2019130199 | A1 | | 7/2019 | |
| WO | 2020240366 | A1 | | 12/2020 | |
| WO | WO-2020240447 | A1 | * | 12/2020 | ............. F28F 19/04 |
| WO | 2021124121 | A1 | | 6/2021 | |
| WO | 2023203489 | A1 | | 10/2023 | |

OTHER PUBLICATIONS

International Search Report for PCT Application No. PCT/IB2023/053968, mailed on Aug. 3, 2023, 3 pages.

* cited by examiner

PASSIVE RADIATIVE COOLING FILM FOR ANTENNAS

CROSS REFERENCE TO RELATED APPLICATIONS

This application is a national stage filing under 35 U.S.C. 371 of PCT/IB2023/053968, filed 18 Apr. 2023, which claims the benefit of U.S. Application No. 63/333,152, filed 21 Apr. 2022, the disclosure of which is incorporated by reference in its/their entirety herein.

BACKGROUND

Cellular antennas, including 5G antennas, are being installed a high rate. Today cellular antennas are simply cooled on the back side by convective cooling with aluminum heat transfer fins or pins. Size and information transmission rate of the antenna are limited by heat. Applying innovate radiative cooling materials in addition to convective cooling materials on the front and back side of the antenna will reduce its temperature and thus enable higher information transmission rates.

SUMMARY

A cooling film for use with an antenna includes an antisoiling layer secured to a first major surface of a reflective microporous layer. The reflective microporous layer includes a first fluoropolymer and is diffusely reflective of electromagnetic radiation over a majority of wavelengths in the range of 400 to 2500 nanometers. The antisoiling layer has an outwardly facing antisoiling surface opposite the reflective microporous layer. The film is shaped into a self-supporting three-dimensional structure and configured for securing the film to the front side, adjacent surfaces, or back side of the antenna for cooling the antenna. In addition, enhanced cooling on the back side of the antenna can be achieved by attaching a metallized solar reflector to the fins and substrate of an existing aluminum (or other metal) heat sink. The metallized solar reflector also has an antisoiling layer and a material with high thermal emissivity between the antisoiling layer and the metallized solar reflector.

DETAILED DESCRIPTION

Figure 1:
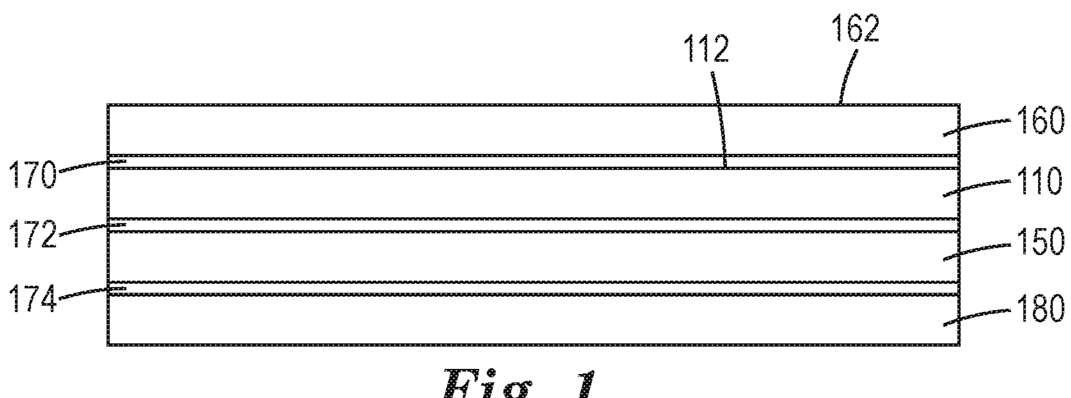
FIG. 1 is a schematic side view of an exemplary composite cooling film.

Embodiments include a passive radiative cooling film for an antenna surface that improves both radiative and convective heat transfer from the antenna without interfering with electromagnetic transmission. Metal free surface structured radiative cooling films can be applied to the front side of the antenna. Either metallized or non-metallized radiative cooling films having surface structures can be applied to the back side of the antenna.

Cooling Film

As used herein:

"fluoropolymer" refers to any organic polymer containing fluorine;

"infrared" (IR) refers to infrared electromagnetic radiation having a wavelength of >700 nm to 1 mm, unless otherwise indicated;

"visible" (VIS) refers to visible electromagnetic radiation having a wavelength to from 400 nm to 700 nm, inclusive, unless otherwise indicated;

"ultraviolet" (UV) refers to ultraviolet electromagnetic radiation having a wavelength of at least 250 nm and up to but not including 400 nm, unless otherwise indicated;

"microporous" means having internal porosity (continuous and/or discontinuous) having average pore diameters of 50 to 10,000 nm;

"micro-voided" means having internal discrete voids having an average void diameter of 100 to 3000 nm;

"nonfluorinated polymer" refers to any organic polymer not containing fluorine;

"radiation" means electromagnetic radiation unless otherwise specified;

"secured to" means directly or indirectly affixed to (e.g., in direct contact with, or adhesively bonded to by a unitary layer of adhesive)

"average reflectance" means reflectance averaged over a specified wavelength range;

"reflective" and "reflectivity" refer to the property of reflecting light or radiation, especially reflectance as measured independently of the thickness of a material; and "reflectance" is the measure of the proportion of light or other radiation striking a surface at normal incidence which is reflected off it. Reflectivity typically varies with wavelength and is reported as the percent of incident light that is reflected from a surface (0 percent—no reflected light, 100—all light reflected. Reflectivity and reflectance are used interchangeably herein.

Absorbance can be measured with methods described in ASTM E903-12 "Standard Test Method for Solar Absorptance, Reflectance, and Transmittance of Materials Using Integrating Spheres". Absorbance measurements described herein were made by making transmission measurements as previously described and then calculating absorbance using Equation 1.

As used herein, the term "absorbance" refers to the base 10 logarithm of a ratio of incident radiant power to transmitted radiant power through a material. The ratio may be described as the radiant flux received by the material divided by the radiant flux transmitted by the material. Absorbance (A) may be calculated based on transmittance (T) according to Equation 1:

$$A = -\log_{10} T \tag{1}$$

Emissivity can be measured using infrared imaging radiometers with methods described in ASTM E1933-14 (2018) "Standard Practice for Measuring and Compensating for Emissivity Using Infrared Imaging Radiometers."

As shown in FIG. 1, an exemplary composite cooling film comprises a reflective microporous layer 110 having an antisoiling layer 160 secured thereto. Antisoiling layer 160 is secured to a major surface 112 of reflective microporous layer 110 such that the outwardly facing antisoiling surface 162 is opposite reflective microporous layer 110.

Optional infrared-reflective (IR-reflective) layer 150 is secured to reflective microporous layer 110 opposite antisoiling layer 160. Optional adhesive layers 170, 172 may adhere various components together as shown in FIG. 1. Optional adhesive layer 174 may be releasably bonded to optional liner 180. In one embodiment, after removal of optional liner 180, optional adhesive layer 174 may be bonded to a substrate (e.g., a radio frequency antenna surface) to be cooled.

Composite cooling films according to the present disclosure preferably have an average absorbance over the wavelength range 8-13 microns of at least 0.85, preferably at least 0.9, and more preferably at least 0.95, although this is not a requirement.

Reflective Microporous Layer

The reflective microporous layer may comprise a network of interconnected voids and/or discrete voids, which may be spherical, oblate, or some other shape. Primary functions of the reflective microporous layer include reflecting at least a portion of visible and infrared radiation of the solar spectrum and to emit thermal radiation in the atmospheric window (i.e., wavelengths of 8 to 13 microns).

Accordingly, the reflective microporous layer has voids that are of appropriate size that they diffusely reflect light with wavelengths in the 400 nm to 700 nm, preferably 300 nm to 2500 nm, wavelength range. Generally, this means that the void sizes should be in a size range (e.g., 50 to 3000 nm) capable of reflecting light in the 300 nm to 2500 nm wavelength range. Preferably, a range of void sizes corresponding to those dimensions is present so that effective broadband reflection with be achieved.

Reflectivity of the reflective microporous layer is generally a function of the number of polymer film/void interfaces, since reflection (typically diffuse reflection) occurs at those locations. Accordingly, the porosity and thickness of the reflective microporous layer will be important variable. In general, higher porosity and higher thickness correlate with higher reflectivity. However, for cost considerations film thickness is preferably minimized, although this is not a requirement. Accordingly, the thickness of the reflective microporous layer is typically in the range of 10 microns to 500 microns, preferably in the range of 10 microns to 200 microns, although this is not a requirement. Likewise, the porosity of the reflective microporous layer is typically in the range of 10 volume percent to 90 volume percent, preferably in the range of 20 volume percent to 85 volume percent, although this is not a requirement.

Exemplary materials that may be useful at least one (preferably only one) of the reflective microporous layer (which contains at least one fluoropolymer) or an auxiliary reflective microporous layer (which does not include a fluoropolymer) are set forth below. Selection of which microporous material to include in which layer(s) will be apparent in view of the preceding discussion.

Microporous polymer films suitable for use as the reflective microporous layer are known in the art and are described, for example, in U.S. Pat. Nos. 8,962,214; 10,240,013; and 4,874,567. These films may have average pore diameters of at least 0.05 microns.

In certain embodiments, the reflective microporous layer includes at least one Thermally Induced Phase Separation (TIPS) material. The pore size of TIPS materials can be generally controlled due to the ability to select the extent of stretching of the layer. TIPS materials are relatively inexpensive to make, and methods for making them are known to the skilled practitioner. For example, various materials and methods are described in detail in U.S. Pat. Nos. 4,726,989; 5,238,623; 5,993,954; and 6,632,850. Reflective microporous layers for use in aspects of the present disclosure also include Solvent Induced Phase Separated (SIPS) materials (e.g., U.S. Pat. No. 4,976,859) and other reflective microporous layers made by extrusion, extrusion/stretching and extrusion/stretching/extraction processes. Suitable reflective microporous layers that may be formed by SIPS include for example and without limitation polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable reflective microporous layers that may be formed by stretching techniques (e.g., U.S. Pat. No. 6,368,742) include for example and without limitation polytetrafluoroethylene (PTFE) and polypropylene.

In certain embodiments, the reflective microporous layer comprises a thermoplastic polymer, for instance polyethylene, polypropylene, 1-octene, styrene, polyolefin copolymer, polyamide, poly-1-butene, poly-4-methyl-1-pentene, polyethersulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, polytetrafluoroethylene, or combinations thereof.

In some embodiments, the solar reflective microporous polymer layer includes GORE-TEX available form W. L. Gore.

Materials suitable for use as the reflective microporous layer include non-woven fibrous layers.

Polymeric non-woven layers can be made using a melt blowing process. Melt blown non-woven fibrous layers can contain very fine fibers. In melt-blowing, one or more thermoplastic polymer streams are extruded through a die containing closely arranged orifices. These polymer streams are attenuated by convergent streams of hot air at high velocities to form fine fibers, which are then collected on a surface to provide a melt-blown non-woven fibrous layer. Depending on the operating parameters chosen, the collected fibers may be semi-continuous or essentially discontinuous.

Polymeric non-woven layers can also be made by a process known as melt spinning. In melt spinning, the non-woven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt-spun fibers are collected as a fibrous web and optionally subjected to one or more bonding operations to fuse the fibers to each other. Melt-spun fibers are generally larger in diameter than melt-blown fibers.

Polymers suitable for use in a melt blown or melt spinning process include polyolefins such as polypropylene and polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinyl acetate, polyacrylonitrile, cyclic polyolefin, and copolymers and blends thereof. In some embodiments, the polymer, copolymer, or blend thereof represents at least 35% of the overall weight of the directly formed fibers present in the non-woven fibrous layer.

Non-woven fibers can be made from a thermoplastic semi-crystalline polymer, such as a semi-crystalline polyester. Useful polyesters include aliphatic polyesters. Nonwoven materials based on aliphatic polyester fibers can be especially advantageous in resisting degradation or shrinkage at high temperature applications. This property can be achieved by making the non-woven fibrous layer using a melt blowing process where the melt blown fibers are subjected to a controlled in-flight heat treatment operation immediately upon exit of the melt blown fibers from the multiplicity of orifices. The controlled in-flight heat treatment operation takes place at a temperature below a melting temperature of the portion of the melt blown fibers for a time sufficient to achieve stress relaxation of at least a portion of the molecules within the portion of the fibers subjected to the controlled in-flight heat treatment operation. Details of the in-flight heat treatment are described in US Patent Application Publication No. 2016/0298266.

Non-woven fibrous layers that may be used for the reflective microporous layer include ones made using an air laid process, in which a wall of air blows fibers onto a perforated collection drum having negative pressure inside the drum. The air is pulled though the drum and the fibers are collected on the outside of the drum where they are removed as a web. Exemplary embodiments of microporous membrane fabricated with non-woven fibers are highly reflective white papers comprising polysaccharides. Micro-porous polysaccharide white papers having greater than 90% reflectance over visible wavelengths of 400 to 700 nm are available from International Paper, Memphis, Tennessee, under the trade designations IP ACCENT OPAQUE DIGITAL (100 lbs), IP ACCENT OPAQUE DIGITAL (100 lbs), HAMMERMILL PREMIUM COLOR COPY (80 lbs), and HAMMERMILL PREMIUM COLOR COPY (100 lbs). Titania, $BaSO_4$ and other white pigments are often added to paper to increase their reflection of visible light (400-700 nm).

Other non-woven fibrous layers that may be used for the reflective microporous layer include those made using a wet laid process. A wet laying or “wetlaid” process comprises (a) forming a dispersion comprising one or more types of fibers, optionally a polymeric binder, and optionally a particle filler(s) in at least one dispersing liquid (preferably water); and (b) removing the dispersing liquid from the dispersion.

Suitable fibers for use in air laid and wet laid processes include those made from natural (animal or vegetable) and/or synthetic polymers, including thermoplastic and solvent-dispersible polymers. Useful polymers include wool; silk; cellulosic polymers (e.g., cellulose and cellulose derivatives); fluorinated polymers (e.g., polyvinyl fluoride, polyvinylidene fluoride, copolymers of vinylidene fluoride such as poly(vinylidene fluoride-co-hexafluoropropylene), and copolymers of chlorotrifluoroethylene such as poly (ethylene-co-chlorotrifluoroethylene)); chlorinated polymers; polyolefins (e.g., polyethylene, polypropylene, poly-1-butene, copolymers of ethylene and/or propylene, with 1-butene, 1-hexene, 1-octene, and/or 1-decene (e.g., poly (ethylene-co-1-butene), poly(ethylene-co-1-butene-co-1-hexene)); polyisoprenes; polybutadienes; polyamides (e.g., nylon 6, nylon 6,6, nylon 6,12, poly(iminoadipoyliminohexamethylene), poly(iminoadipoyliminodecamethylene), or polycaprolactam); polyimides (e.g., poly(pyromellitimide)); polyethers; polyether sulfones (e.g., poly(diphenyl ether sulfone), or poly(diphenyl sulfone-co-diphenylene oxide sulfone)); polysulfones; polyvinyl acetates; copolymers of vinyl acetate (e.g., poly(ethylene-co-vinyl acetate), copolymers in which at least some of the acetate groups have been hydrolyzed to provide various poly(vinyl alcohols) including poly(ethylene-co-vinyl alcohol)); polyphosphazenes; polyvinyl esters; polyvinyl ethers; poly(vinyl alcohols); polyaramids (e.g., para-aramids such as poly(paraphenylene terephthalamide) and fibers sold under the trade designation KEVLAR by DuPont Co., Wilmington, Delaware, pulps of which are commercially available in various grades based on the length of the fibers that make up the pulp such as, e.g., KEVLAR 1F306 and KEVLAR 1F694, both of which include aramid fibers that are at least 4 mm in length); polycarbonates; and combinations thereof. Nonwoven fibrous layers may be calendered to adjust the pore size.

The use of a reflective micro-voided polymer film as the reflective microporous layer may provide a reflectance that is even greater than that of a silvered mirror. In some embodiments, a reflective micro-voided polymer film reflects a maximum amount of solar energy in a range from 300 to 2500 nanometers (nm). In particular, the use of a fluoropolymer blended into the micro-voided polymer film may provide a reflectance that is greater than other conventional multilayer optical films. Further, inorganic particles including barium sulfate, calcium carbonate, silica, alumina, aluminum silicate, zirconia, and titania may be blended into the micro-voided polymer film for providing high solar reflectance in solar radiation spectra of 0.3 to 2.5 microns and high absorbance in the atmospheric window of 8 to 13 microns, or even 4 to 25 microns. The outer layer may be suitable for protecting the reflective microporous layer, particularly, in outdoor environments. Including the outer layer may also facilitate less soiling of the surface and ease of cleaning the surface.

Exemplary polymers useful for forming the reflective micro-voided polymer film include polyethylene terephthalate (PET) available from 3M Company. Modified PET copolyesters including PETG available, for example, as SPECTAR 14471 and EASTAR GN071 from Eastman Chemical Company, Kingsport, Tennessee, and PCTG available, for example, as TIGLAZE ST and EB0062 also from Eastman Chemical Company are also useful high refractive index polymers. The molecular orientation of PET and PET modified copolyesters may be increased by stretching which increases its in-plane refractive indices providing even more reflectivity in the multilayer optical film. In general, an incompatible polymer additive, or inorganic particle additive, is blended into the PET host polymer at levels of at least 1 wt. %, at least 10 wt. %, at least 20 wt. %, at least 40 wt. %, or even at least 49 wt. % during extrusion prior to stretching to nucleate voids during the stretching process. Suitable incompatible polymers additives for PET include: fluoropolymers, polypropylenes, polyethylenes, and other polymers which do not adhere well to PET. Similarly, if polypropylene is the host polymer, then incompatible polymer additives such as PET or fluoropolymers can be added to the polypropylene host polymer at levels of at least 10 wt. %, at least 20 wt. %, at least 30 wt. %, at least 40 wt. %, or even at least 49 wt. % during extrusion prior to stretching to nucleate voids during the stretching process. Exemplary suitable inorganic particle additives for nucleating voids in micro-voided polymer films include titania, silica, alumina, aluminum silicate, zirconia, calcium carbonate, barium sulfate, and glass beads and hollow glass bubbles, although other inorganic particles and combinations of inorganic particles may also be used. Crosslinked polymeric microspheres can also be used instead of inorganic particles. Inorganic particles can be added to the host polymer at levels of at least 10 wt. %, at least 20 wt. %, at least 30 wt. %, at least 40 wt. %, or even at least 49 wt. % during extrusion prior to stretching to nucleate voids during the stretching process. If present, the inorganic particles preferably have a volume average particle diameter of 5 nm to 1 micron, although other particle sizes may also be used. Hard particles including glass beads and/or glass bubbles can be present on the surface layer of UV mirror skin layer or the antisoiling layer to provide scratch resistance. In some embodiments, glass beads and/or glass bubbles may even protrude from the surface as hemispheres or even quarter spheres.

In some embodiments, micro-voided polymer films comprise a fluoropolymer continuous phase. Exemplary suitable polymers include ECTFE, PVDF, PTFE, and copolymers of tetrafluoroethylene, hexafluoropropylene, and vinylidene fluoride such as, for example, those available under the trade designation THV from 3M Company.

Exemplary micro-voided PET film comprising barium sulfate is available as LUMIRROR XJSA2 from Toray Plastics (America) Inc., North Kingstown, Rhode Island. LUMIRROR XJSA2 comprises $CaCO_3$ inorganic additive to increase its reflectivity of visible light (400-700 nm). Additional exemplary reflective micro-voided polymer films are available from Mitsubishi Polymer Film, Inc., Greer, South Carolina, as HOSTAPHAN V54B, HOSTAPHAN WDI3, and HOSTAPHAN W270.

Exemplary micro-voided polyolefin sheets are described in, for example, U.S. Pat. No. 6,261,994.

The reflective microporous layer is diffusely reflective, for example, of visible radiation over a majority of wavelengths in the range of 400 to 700 nanometers, inclusive. In some embodiments, the reflective microporous layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 700 nm.

The reflectivity of the reflective microporous layer may be reflective over a broader wavelength range. Accordingly, in some embodiments, the reflectivity of the microporous polymer layer may have an average reflectivity of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 2.5 micrometers, preferably at least 300 nm to 3.0 micrometers, although this is not a requirement.

Antisoiling Layer

The antisoiling layer provides a degree of protection from soil accumulation on the surface that could impede the function of the composite cooling film (e.g., by absorbing solar radiation).

Typically, the antisoiling layer is a polymer film, preferably comprising one or more repellent polymers such as, for example, fluoropolymers. Examples of comonomers for making fluoropolymers that may be used include TFE, HFP, THV, PPVE. Exemplary fluoropolymers for use as the antisoiling layer include PVDF, ECTFE, ETFE, PFA, FEP, PTFE, HTE, and combinations thereof. In some embodiments, the fluoropolymer includes FEP. In some embodiments, the fluoropolymer includes PFA.

In some embodiments, the antisoiling layer is applied as a coating onto the reflective microporous layer. Numerous applied antisoiling compositions are known in the art including, for example, those described in US Patent Applications Publication Nos. 2015/0175479 and 2005/0233070, U.S. Pat. No. 6,277,485, and PCT Publication WO 02/12404.

In some embodiments, suitable antisoiling layers include a cross-linked siloxane coating available from Momentive under the trade name SilFORT AS4700 or a cross-linked siloxane coating available from California HardCoating Company under the tradename Perma-New 6000.

In some embodiments, the outward facing surface of the antisoiling layer (i.e., the antisoiling surface) may be micro-structured and/or nano-structured over some or all of its surface; for example, as described in PCT International Application No. PCT/IB2018/060527, filed Dec. 21, 2018 and entitled "ANTISOILING SURFACE STRUCTURES".

An exemplary antisoiling is THV815 which can be coextruded with THV221 to create a bi-layer film having THV815 with a high melting point and THV221 with a low melting point. The THV221 layer can be used as a hot melt adhesive either by coextrusion coating the THV815/THV221 bi-layer film onto micro-porous solar reflective layer or by hot lamination of the THV815/THV221 bi-layer film onto the micro-porous solar reflective layer. Alternate fluoropolymers to THV815 having melting points greater than 150 C can also be used as the antisoiling layer. Alternate fluoropolymers to THV221 having melting points less than 150 C can be used as the hot melt adhesive.

In some embodiments, the nano-structure may be superimposed on the micro-structure on the surface of the antisoiling layer.

The antisoiling layer has a major surface (i.e., an antisoiling surface) that can include micro-structures and/or nano-structures. The micro-structures may be arranged as a series of alternating micro-peaks and micro-spaces. The size and shape of the micro-spaces between micro-peaks may mitigate the adhesion of dirt particles to the micro-peaks. The nano-structures may be arranged as at least one series of nano-peaks disposed on at least the micro-spaces. The micro-peaks may be more durable to environmental effects than the nano-peaks. Because the micro-peaks are spaced only by a micro-space, and the micro-spaces are significantly taller than the nano-peaks, the micro-peaks may serve to protect the nano-peaks on the surface of the micro-spaces from abrasion.

In reference to the antisoiling layer, the term or prefix "micro" refers to at least one dimension defining a structure or shape being in a range from 1 micrometer to 1 millimeter. For example, a micro-structure may have a height or a width that is in a range from 1 micrometer to 1 millimeter.

As used herein, the term or prefix "nano" refers to at least one dimension defining a structure or a shape being less than 1 micrometer. For example, a nano-structure may have at least one of a height or a width that is less than 1 micrometer.

Composite cooling films according to the present disclosure preferably have an average absorbance over the wavelength range 8-13 microns of at least 0.85, preferably at least 0.9, and more preferably at least 0.95, although this is not a requirement.

Multilayer Solar Reflective Film

Multilayer solar reflective films as described in U.S. Pat. No. 9,523,516 and PCT Publication WO 2019/130199 may be applied to the antenna surface to minimize solar absorption and thus increase its ability to cool the electronics within the antenna.

The multilayer solar reflective film may be composed of materials that provide an average reflectance of at least 90 percent over at least the wavelength range of 400 to 1000 nm, and preferably 400 to 2000 nm, and more preferably 350 to 2500 nm.

The number of layers in the solar reflective multilayer optical film is selected to achieve the desired optical properties using the minimum number of layers for reasons of film thickness, flexibility and economy. In the case of reflective films such as mirrors, the number of layers is preferably less than about 2,000, more preferably less than about 1,000, and even more preferably less than about 750. In some embodiments, the number of layers is at least 150 or 200. In other embodiments, the number of layers is at least 250.

Solar reflective multilayer optical film comprises multiple low/high index pairs of film layers, wherein each low/high index pair of optical layers having a combined optical thickness of ½ the center wavelength of the band it is designed to reflect. Stacks of such films are commonly referred to as quarterwave stacks. In some embodiments, different low/high index pairs of layers may have different combined optical thicknesses, such as where a broadband reflective optical film is desired.

The optical layers may comprise fluorinated polymers (i.e., fluoropolymers), non-fluorinated polymers, and blends thereof.

Examples of fluoropolymers that may be used include copolymers of tetrafluoroethylene (TFE), hexafluoropropylene (HFP), and vinylidene fluoride (e.g., available from 3M Company under the trade designation 3M DYNEON THV); a copolymer of TFE, HFP, vinylidene fluoride, and perfluoropropyl vinyl ether (PPVE) (e.g., available from 3M Company under the trade designation 3M DYNEON THVP); a polyvinylidene fluoride (PVDF) (e.g., 3M DYNEON PVDF 6008 from 3M Company); ethylene chlorotrifluoroethylene polymer (ECTFE) (e.g., available as HALAR 350LC ECTFE from Solvay, Brussels, Belgium); an ethylene tetrafluoroethylene copolymer (ETFE) (e.g., available as 3M DYNEON ETFE 6235 from 3M Company); perfluoroalkoxyalkane polymers (PFA); fluorinated ethylene propylene copolymer (FEP); a polytetrafluoroethylene (PTFE); copolymers of TFE, HFP, and ethylene (HTE) (e.g., available as 3M DYNEON HTE1705 from 3M Company). Combinations of fluoropolymers can also be used. In some embodiments, the fluoropolymer includes FEP. In some embodiments, the fluoropolymer includes PFA.

Examples of non-fluorinated polymers that may be used in at least one layer of the solar reflective multilayer optical film include at least one of: polyethylene terephthalate, polypropylene, polyethylene, polyethylene copolymers, polymethyl methacrylate, methyl methacrylate copolymers (e.g., copolymers of ethyl acrylate and methyl methacrylate), polyurethanes, extended chain polyethylene polymers (ECPEs), or a combinations thereof. In general, combinations of non-fluorinated polymers can be used. Exemplary non-fluorinated polymers, especially for use in low refractive index optical layers, may include homopolymers of polymethyl methacrylate (PMMA), such as those available as CP71 and CP80 from Ineos Acrylics, Inc., Wilmington, Delaware; and polyethyl methacrylate (PEMA), which has a lower glass transition temperature than PMMA. Additional useful polymers include: copolymers of methyl methacrylate such as, for example, a copolymer made from 75 wt. % methyl methacrylate and 25 wt. % ethyl acrylate, for example, as available from Ineos Acrylics, Inc. as PERSPEX CP63, or as available from Arkema, Philadelphia, Pennsylvania as ALTUGLAS 510, and copolymers of methyl methacrylate monomer units and n-butyl methacrylate monomer units.

Blends of PMMA and PVDF may also be used.

Suitable triblock acrylic copolymers are available, for example, as KURARITY LA4285 from Kuraray America Inc., Houston, Texas. Additional suitable polymers for the optical layers, especially for use in the low refractive index optical layers, may include at least one of: polyolefin copolymers such as poly(ethylene-co-octene) (e.g., available as ENGAGE 8200 from Dow Elastomers, Midland, Michigan), polyethylene methacrylate (e.g., available as ELVALOY from Dow Elastomers), poly(propylene-co-ethylene) (e.g., available as Z9470 from Atofina Petrochemicals, Inc., Houston, Texas); and a copolymer of atactic polypropylene and isotactic polypropylene. Materials may be selected based on absorbance or transmittance properties described herein, as well as on refractive index. In general, the greater the refractive index between two materials, the thinner the film can be, which may be desirable for efficient heat transfer.

For solar reflective multilayer optical films, a quarterwave stack design preferably results in each of the layers in the multilayer stack having an average thickness of not more than about 0.7 micrometers, although this is not a requirement.

Multilayer optical films (including reflective polarizers and mirrors) can be made by coextrusion of alternating polymer layers having different refractive indices, for example, as described in U.S. Pat. Nos. 6,045,894; 6,368,699; 6,531,230; 6,667,095; 6,783,349; 7,271,951; 7,632,568; and 7,952,805; and PCT Publications WO 95/17303 and WO 99/39224.

Optional IR-reflective layers that can be vapor coated under the solar reflective multilayer optical film also include: layers of a metal such as, for example, aluminum, copper, gold, or silver; and layers of metal oxide or metal sulfide such as, for example, cerium oxide, aluminum oxide, magnesium oxide, titanium dioxide, and indium tin oxide.

Optional Adhesive Layers

The optional adhesive layers may comprise any adhesive (e.g., thermosetting adhesive, hot melt adhesive, and/or pressure-sensitive adhesive). If present, optional adhesive layer preferably comprises a pressure-sensitive adhesive. In some embodiments, the adhesive may be resistant to ultraviolet radiation damage. Exemplary adhesives which are typically resistant to ultraviolet radiation damage include silicone adhesives and acrylic adhesives containing UV-stabilizing/blocking additive(s), for example, as discussed hereinabove. An exemplary optional adhesive is polyisobutylene which can minimize moisture transmission into microporous and micro-voided solar reflective layer.

The optional adhesive layer may be a hot melt adhesive. An exemplary hot melt adhesive is THV221.

The optional adhesive layers may comprise thermally-conductive particles to aid in heat transfer. Exemplary thermally-conductive particles include aluminum oxide particles, alumina nanoparticles, hexagonal boron nitride particles and agglomerates (e.g., available as 3M BORON NITRIDE from 3M Company), graphene particles, graphene oxide particles, metal particles, and combinations thereof.

Optional releasable liners may comprise, for example, a polyolefin film, a fluoropolymer film, a coated PET film, or a siliconized film or paper.

UV-Stabilizing Additives

UV-stabilizing additives may be added to any component of the composite cooling film (e.g., the UV-reflective multilayer optical film, the optional antisoiling layer, optional adhesive layers, the reflective microporous layer, and/or the IR-reflective layer)

UV stabilization with UV-absorbers (UVAs) and/or Hindered Amine Light Stabilizers (HALS) can intervene in the prevention of photo-oxidation degradation of PET, PMMA, and CoPMMAs. Exemplary UVAs for incorporation into PET, PMMA, or CoPMMA polymer layers include benzophenones, benzotriazoles, and benzotriazines. Commercially available UVAs for incorporation into PET, PMMA, or CoPMMA optical layers include those available as TINUVIN 1577 and TINUVIN 1600 from BASF Corporation, Florham Park, New Jersey. Typically, UVAs are incorporated in polymers at a concentration of 1 to 10 weight percent (wt. %).

Exemplary HALS compounds for incorporation into PET, PMMA, or CoPMMA optical layers include those available as CHIMMASORB 944 and TINUVIN 123 from BASF Corporation. Typically, HALS compounds are incorporated into the polymer at a 0.1-1.0 wt. %. A 10:1 ratio of UVA to HALS may be preferred.

UVAs and HALS compounds can also be incorporated into the fluoropolymer layers. U.S. Pat. No. 9,670,300 and US Patent Application Publication No. 2017/0198129 describe exemplary UVA oligomers that are compatible with PVDF fluoropolymers.

Other UV-blocking additives may be included in the fluoropolymer layers. For example, small particle non-pigmentary zinc oxide and titanium oxide can be used. Nanoscale particles of zinc oxide, calcium carbonate, and barium sulfate reflect, or scatter, UV-light while being transparent to visible and near infrared light. Small zinc oxide and barium sulfate particles in the size range of 10-100 nanometers can reflect UV-radiation are available, for example, from Kobo Products Inc., South Plainfield, New Jersey.

Antistatic additives may also be incorporated into any of the polymer films/layers to reduce unwanted attraction of dust, dirt, and debris. Ionic salt antistatic additives available from 3M Company may be incorporated into PVDF fluoropolymer layers to provide static dissipation. Exemplary antistatic additives for PMMA and CoPMMA are commercially available as STAT-RITE from Lubrizol Engineered Polymers, Brecksville, Ohio, or as PELESTAT from Sanyo Chemical Industries, Tokyo, Japan.

Cooling Films for Antennas

Composite cooling films described herein can be used to cool a substrate such as an antenna with which they are in thermal (e.g., inductive, convective, radiative) communication. Reflectance in the solar region may be particularly effective in facilitating cooling during the day when subjected to sunlight by reflecting sunlight that would otherwise be absorbed by the substrate or object. Absorption in the atmospheric window region may be particularly effective in facilitating cooling at night by radiating or emitting infrared light. Energy may also be radiated or emitted during the day to some degree. In some embodiments, the outer layer of the article will absorb a minimum of solar energy from 0.3 to 2.5 micrometers and absorb a maximum of solar energy from 8 to 14 micrometers, or even 4 to 25 microns.

Figure 2:
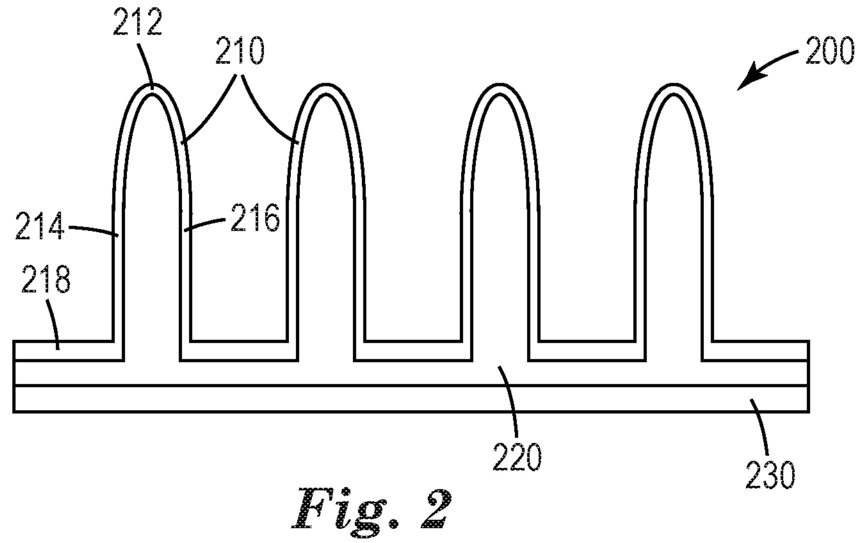
FIG. 2 is a side view of a cooling film applied to an antenna in a first embodiment.

In one embodiment, passive radiative cooling articles are made as described above and corrugated or thermoformed or microreplicated to have heat transfer fins as shown in FIG. 2. In particular, a non-metallic passive radiative cooling film or article 200 can be formed into fins 210 and include a thermally conductive polymer or adhesive 220 in fins 210. The formed cooling film 200 can be secured, via polymer or adhesive 220, to a front side or back side of an antenna 230 for cooling the antenna. Adhesive layer 220 can optionally comprise glass beads or glass fibers for increased heat transfer. The optional glass beads or glass fibers can be coated with aluminum or other metal to further enhance heat transfer. Fins 210 form a self-supporting three-dimensional (3D) structure having a peak 212 opposite a base 218 and opposing sides 214 and 216 extending between peak 212 and base 218. Fins 210 preferably extend along a length of the film, and the fins are self-supporting in that the fins substantially maintain their shape without additional supporting structure. Aside from fins, other self-supporting 3D structures can be formed from film or article 200. For improved thermally conductive heat transfer, boron nitride, or other non-metallic, thermally conductive materials can be incorporated into cooling film or article 200. Also, film 200 can optionally include the non-metallized IR-reflective layer.

Figure 3:
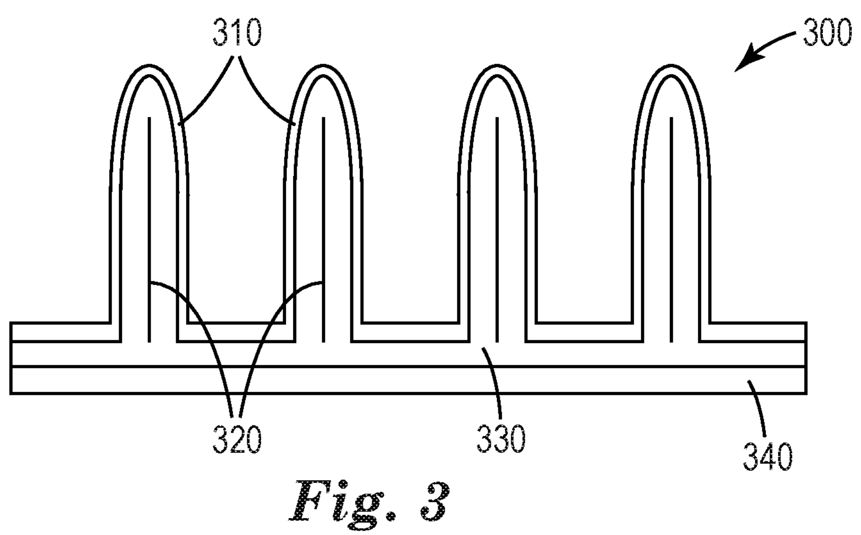
FIG. 3 is a side view of a cooling film applied to an antenna in a second embodiment.

In another embodiment, passive radiative cooling articles are made as described above and corrugated or thermoformed or microreplicated to have heat transfer fins as shown in FIG. 3. In particular, a polymer covered metallic or non-metallic passive radiative cooling film or article 300 can be formed into fins 310 and include a thermally conductive polymer or adhesive 330 in fins 310. Fins 310 can include metal fins 320 in thermally conductive polymer or adhesive 330. Fins 310 can include the same or similar self-supporting 3D structure as fins 210. Alternatively, other self-supporting 3D structures can be formed from film or article 300. The formed cooling film 300 can be secured, via polymer or adhesive 330, to a back side of an antenna 340 for cooling the antenna. For improved thermally conductive heat transfer, glass beads, glass fibers, boron nitride, non-metallic, or metallic thermally conductive materials could be incorporated into the shaped passive radiative cooling article 300. Also, film 300 can optionally include the metallized IR-reflective layer.

In another embodiment, passive radiative cooling film can be adhered to the fins of conventional aluminum (or other thermally conductive material) heat sink fins and substrate to minimize solar absorption. Specular solar reflective cooling films will be more effective than diffuse solar reflective cooling films when applied to the sides and base of heat sink fins.

Cooling films or articles 200 and 300 can implemented with, for example, the cooling film described above with respect to FIG. 1 and then shaped into fins as shown or other self-supporting 3D structures. Cooling films or articles 200 and 300 can optionally have additional layers or elements as described with respect to the cooling film shown in FIG. 1. The cooling films can be used to passively cool antennas, such as cellular or 5G antennas.

Conventional pigment filled polymer radomes reflect 60-80% of solar energy. When solar energy irradiation is 1000 W/m2, the pigment filled polymer radome will absorb 200 W/hr to 400 W/hr under full solar exposure. The micro-porous fluoropolymer film described herein reflects 95% of solar energy and thus absorbs only 50 W/hr under full solar exposure. A radome covered with embodiments of this invention will provide at least 150 W/hr more cooling power than conventional radomes under full solar exposure.

A variety of materials have been used in the construction of radomes. Polyurethane foams (GeneralPlastics manufacturing company) have been used to form a protective cover between an antenna and the outdoors, for example. The polyurethanes are often part of a composite material used in the construction. Other common materials used in radomes include polyolefins, polycarbonates, epoxies, nylon, TEFLON™, and polystyrene (Shreyasi Bhowmik, "Investigation of Wide Band mm-Wave Radome," Table 2.1, KTH Royal Institute of Technology (2017)). Radomes can be part of an aerospace construction, or a land or space based construction.

Other examples of cooling films are described in PCT Publications WO 2020/240447, WO 2020/240366, and WO 2019/130199.

Figure 4A:
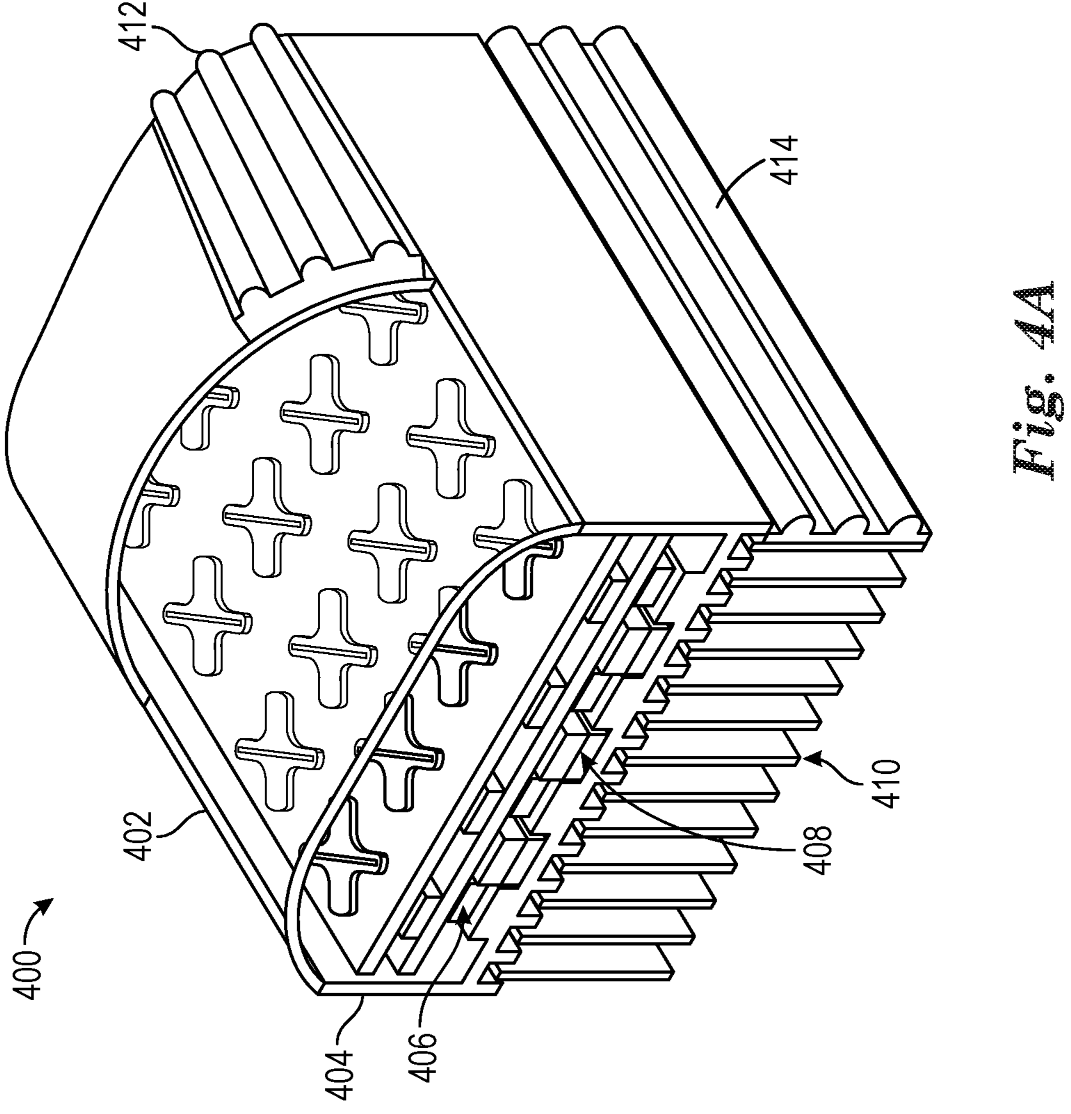
FIGS. 4A and 4B are perspective and side sectional views, respectively, of an antenna illustrating placement of cooling films on it.
Figure 4B:
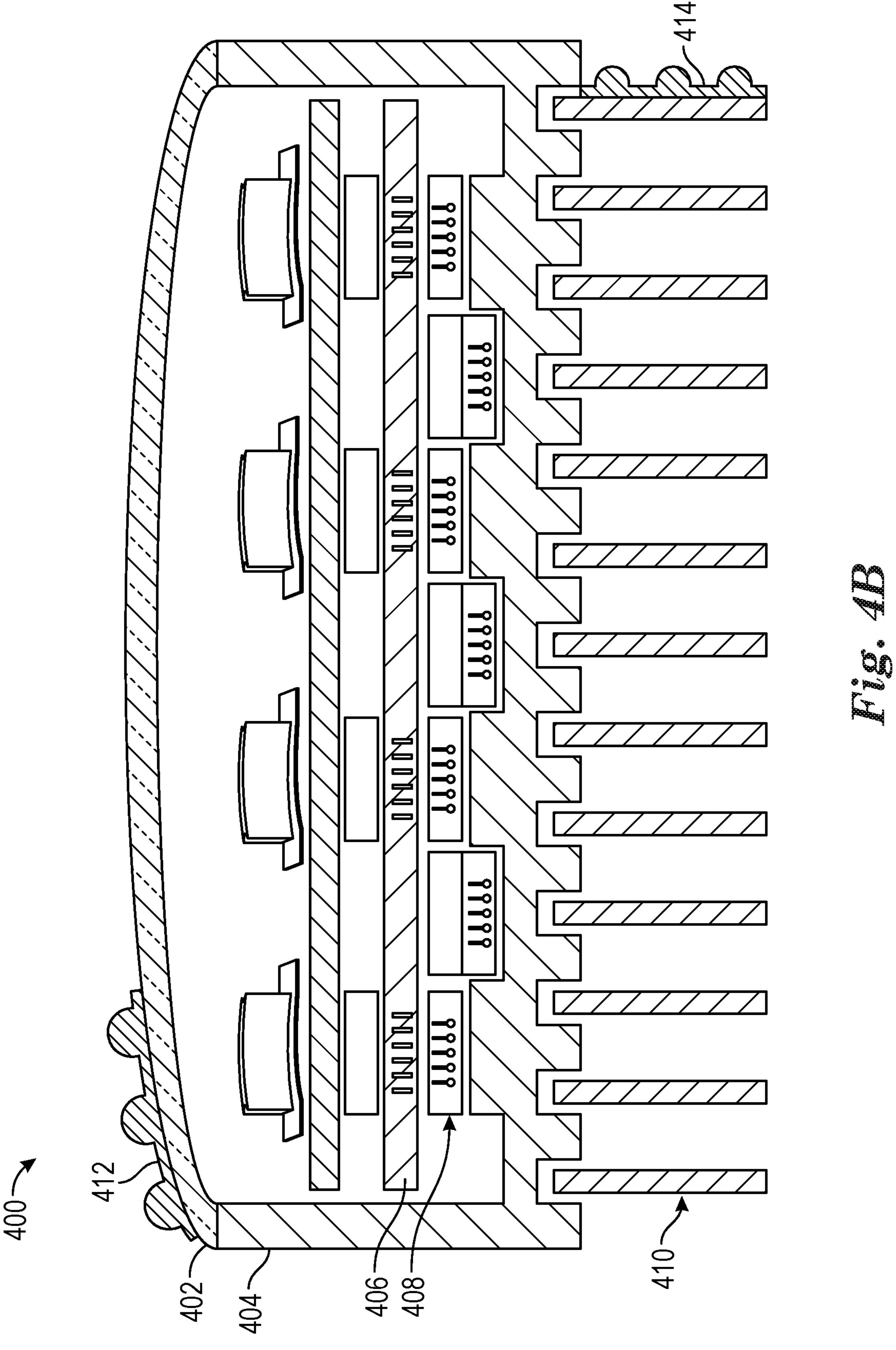

FIGS. 4A and 4B are perspective and side sectional views, respectively, of an antenna 400 illustrating placement of cooling films on it. Antenna 400 includes a radome 402 over the RF transmitter and receiver elements, a housing 404, thermal vias 406, thermal pads 408, and bonded metal fins 410. A cooling film 412 can be placed on or secured to radome 402, and another cooling film 414 can be placed on or secured to fins 410 for cooling antenna 400. Cooling film 412 can be any of the non-metallized cooling films described herein, and cooling film 414 can be any of the cooling films described herein and typically the metallized version for enhanced cooling. Cooling films 412 and 414 are shown on only a portion of the radome and fins, respectively, for illustrative purposes. Cooling film 412 could cover the entire radome or only a portion of it, and cooling film 414 can be placed on all of the fins or only some of them. Cooling films can optionally be placed on or secured to other surfaces of antenna 400. Cooling films described herein can also be used with other types of antennas, or other objects or articles, for passively cooling them.

Embodiments of the cooling films described herein can also be placed on radomes for radar systems in order to help cool the radar systems.

EXAMPLES

The following are Examples of metallized and non-metallized passive radiative cooling films for RF antenna cooling.

Example 1—Metallized Multilayer Passive Radiative Cooling Film (PRCF1)

A visible (VIS) and near infrared (IR) light reflecting multilayer optical mirror film was made with first optical layers created from PET (available under the tradename "Eastapak 7452" from Eastman) and second optical layers created from a 50:50 polymer blend of PVDF (available under the tradename "PVDF 6008" from 3M Company) and PMMA (available under the tradename "VO44" from Arkema). The PET and 50:50 PVDF:PMMA polymer blend were coextruded through a multilayer polymer melt manifold to form a stack of 650 optical layers. The optical layer thickness profile of this VIS and IR reflecting mirror film was adjusted to be approximately a linear profile with the first (thinnest) optical layers adjusted to have about a ¼ wave optical thickness (refractive index times physical thickness) for 400 nm light and progressing to the thickest optical layers which were adjusted to have about a ¼ wave optical thickness for 950 nm light. Layer thickness profiles of such films can be adjusted to provide for improved spectral characteristics using the axial rod apparatus taught in U.S. Pat. No. 6,783,349 combined with layer profile information obtained with microscopic techniques.

In addition to these optical layers, the film had non-optical skin layers of PET having a thickness of 100 microns on one side of the optical layer stack and a 35:65 polymer blend of PVDF:PMMA also having a thickness of 100 microns on the other side of the optical layer stack. The PVDF:PMMA polymer blend layer also comprised 2 wt % UVA (available under the trade name Tinuvin 1600 from BASF). This multilayer coextruded polymer melt flow was cast onto a chilled roll at 22 meters per minute creating a multilayer cast film approximately 1400 microns thick. The multilayer cast film was then preheated to a temperature of 95 C and length oriented at a draw ratio of 3.5:1 followed by preheating to 100 C and transversely oriented in a tenter oven at a draw ratio of 3.8:1. The biaxially oriented multilayer optical film was further heated to 225° C. for 10 seconds to anneal the PET layers. The resulting VIS and IR reflecting mirror film was measured with a Lambda 1050 spectrophotometer to have an average reflectivity of 98% over a wavelength range of 400 nm to 950 nm.

A 110 nm layer of silver was then vapor coated onto the PET side of the VIS and IR reflecting mirror film to create a broadband solar mirror film followed by vapor coating an approximately 20 nm copper layer to protect the silver layer from corrosion. The resulting broadband solar mirror film was measured with a Lambda spectrophotometer to have an average reflectivity of 95% over a wavelength range of 400 nm to 2500 nm.

A cross-linked acrylic hard coat containing UV absorbers as described in U.S. Pat. No. 10,072,173 was then coated onto the PVDF:PMMA polymer blend skin layer at a thickness of 15 microns to provide UV protection and scratch resistance resulting in a passive radiative cooling film (PRCF1). An additional layer of acrylic adhesive was then coated onto the PET skin layer for adhering PRCF1 to substrates such as aluminum sheets and aluminum finned heat sinks.

Example 2—Metallized Passive Radiative Cooling Film Applied to RF Antenna Heat Sink Fins Two aluminum heat sinks with heat aluminum heat dissipation fins were fabricated as shown in Image 1. Images 1 and 2 for this Example 2 and for Examples 6 and 7 provided below are disclosed in the priority U.S. Provisional Patent Application No. 63/333,152 filed Apr. 21, 2022. Two aluminum heat sink bases were fabricated with 0.25" thick aluminum plate having dimensions of 12"×12"×0.25". Slots measuring 0.25" wide×12" long were machined into the top surfaces of the aluminum plates spaced apart by 0.25". Aluminum fins measuring 0.25" thick by 2" tall by 12" were fabricated and pressed into the aluminum heat sink base as shown in Image 1. A 700 W flexible blanket heater available from Watlow was placed under each aluminum heat sink base and above sheets of 1"×14"×14" Styrofoam. PRCF as described in Example 1 was laminated to the aluminum heat sink fins and base with pressure sensitive adhesive as shown in Image 2. Both aluminum heat sink fin prototypes were heated to a temperature 15 C above ambient air temperature with the Watlow blank heaters. Under direct solar exposure irradiance of 800 W/m2, prototype 1 required 100 W/m2 to maintain a temperature of 15 C above ambient whereas prototype 2 with PRCF required 300 W/m2 to maintain a temperature of 15 C above ambient temperature. On average over a 24 hr period, prototype 1 required 178 W/m2 to maintain a temperature of 15 C above ambient whereas prototype 2 with PRCF required 329 W/m2 to maintain a temperature of 15 C above ambient temperature. The differences in power required to maintain above ambient temperature of the bare aluminum heat sink fins versus the PRCF covered aluminum heat sink fins is due to higher solar energy absorbed by aluminum versus solar energy absorbed by PRCF.

Example 3—Micro-Porous PTFE (PRCF2)

Ultra-high molecular weight polyethylene (UHMWPE) powder (obtained under the trade designation "GUR-2126" from Celanese Corporation, Irvine, TX, US) was metered into the feed funnel of a twin-screw extruder (25 mm co-rotating twin screw extruder, Berstorff, Germany) at 300 rpm, 65° C., from a powder feeder (KT20, Coperion K-Tron, Stuttgart, Germany) at the rate shown in Table 1. Mineral oil (Kaydol White Mineral Oil from Brenntag Great Lakes, LLC) was pumped into the open barrel zone 2 of the extruder at 110° C. using a gear pump (Zenith Pumps, Monroe, NC, US) and Coriolis mass flow meter (Micromotion mass flow meter, Emerson Electric Co, St. Louis, MO, US) at the rate shown in Table 1, mixed and heated to 204° C. to melt the UHMWPE into the mineral oil. Finally, PTFE particles (PTFE; of the grade shown in Table 1, 3M Company St. Paul, MN, US) was fed from a powder feeder into a side stuffer (Side Feeder, Century Extrusion, Travers City, MI, US) at 200 rpm connected to zone 4 of the twin screw extruder at 204° C. and was incorporated into the melt. The extruder mixed, dispersed, and increased the temperature of the melt making a stable mixture (i.e., a suspension). The mixture was then extruded through a drop die (6" (15.24 cm), Wide Ultraflex U40, Nordson Extrusion Dies LLC, Chippewa Falls, WI, US) at 190° C. onto a smooth casting roll at 60° C. and the speed shown in Table 1 and quenched to form a film. Upon quenching, the ultra-high molecular weight polyethylene phase-separated from the suspension forming a phase separated porous polymeric network structure connecting the PTFE particles and mineral oil filling the voids. The mineral oil in the film was then extracted with 3M NOVEC 72DE (3M Company, St. Paul, MN, US) by running the film through a counter current extraction bath at a rate of 10 fpm (feet per minute). The bath having a total of 300 gallon capacity divided into seven tanks. 3M NOVEC 72DE exchange rate to the bath was 52 gallons per hour. The film was then conveyed through a dryer at 83° C. to evaporate and recover the NOVEC 72DE, and a porous film was obtained. 10 to 50 yards of the porous film were produced.

TABLE 1

| | EX3 PFL2276-9 |
|---|---|
| UHMWPE feed rate [lb/hr] | 0.75 |
| Mineral oil feed rate [lb/hr] | 3.5 |
| PTFE Grade | TF9205 |
| PTFE feed rate [lb/hr] | 7.0 |
| Casting roll speed [fpm] | 2.5 |
| PTFE content [wt.-%] | 90.3 |

The test results of the obtained porous film are shown in Table 2.

TABLE 2

| | EX3 PFL2276-9 |
|---|---|
| Thickness of porous film [mil] | 18.4 |
| Thickness of porous film [mm] | 0.47 |
| Mass of disc (47 mm Ø) of porous film [g] | 0.8976 |
| Density of porous film [g/cm$^3$] | 1.11 |
| Porosity of porous film [%] | 42.9 |
| Air flow resistance (Gurley), 50 cm$^3$, of porous film [sec] | 617.7 |
| Limiting pore diameter of porous film (bubble point pressure test) [μm] | 0.21 |

Figure 5:
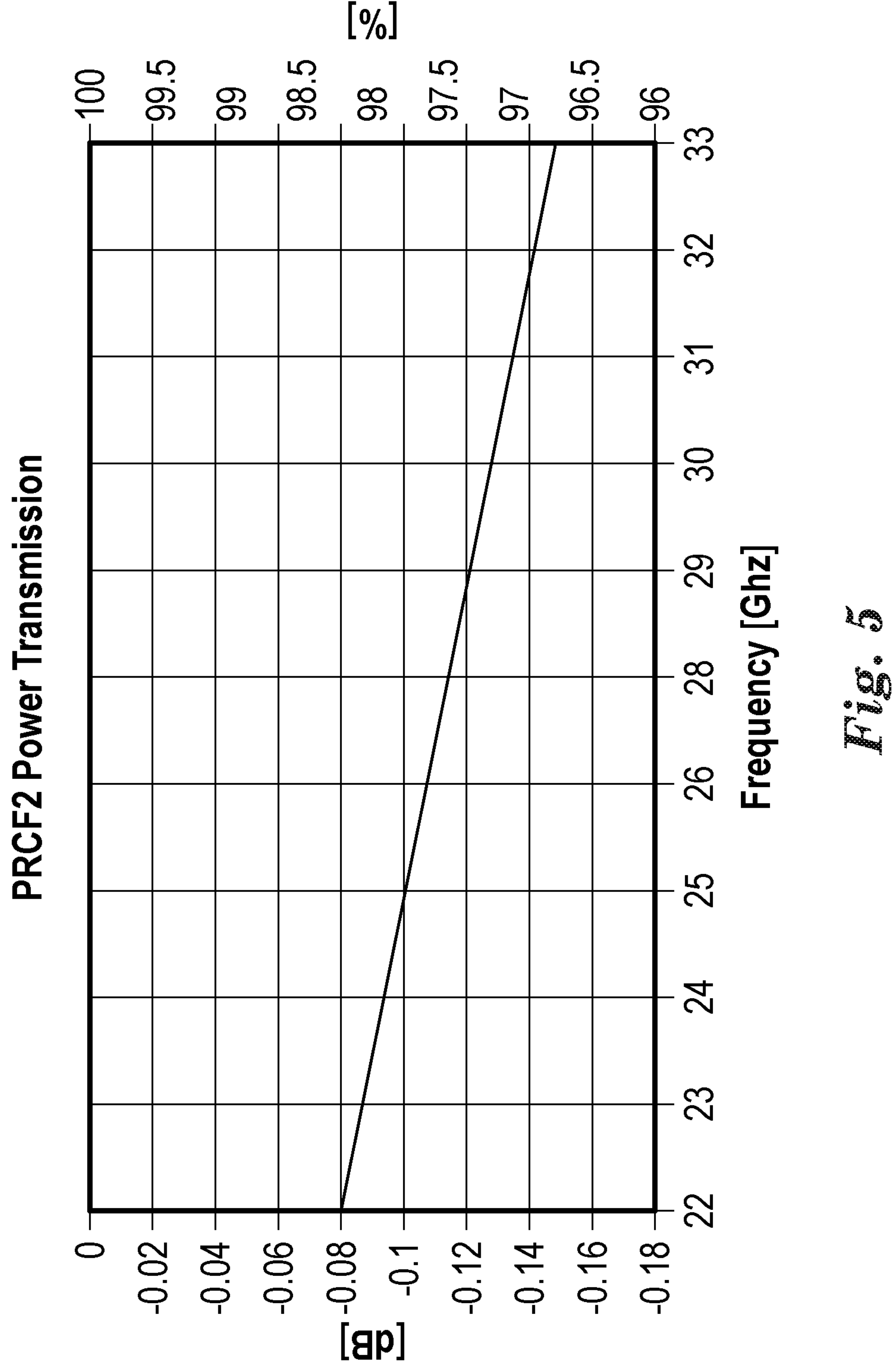
FIG. 5 is a graph of RF power transmission through a cooling film for the Examples.

The resulting micro-porous PTFE (PRCF2) was measured with a Lambda 1050 spectrophotometer to have an average reflectivity of 95% over a wavelength range of 400 nm to 2500 nm. PRCF2 was also measured to be highly transparent to radio frequency (RF) wavelengths as shown in FIG. 5. High RF transmission enables PRCF 2 to be used on the front side of RF antenna covers (radomes).

Test Method for RF Transmission of Example 3 (PRCF2)

Dielectric Properties Using Split-Post Dielectric Resonators

All dielectric properties were measured using split-post dielectric resonators (SPDRs) at 1.1, 2.5, 5.2, and 10.1 GHz using 0.5 mm-thick film samples and at 15.2, 24.7, and 33.6 GHz using 0.3 mm-thick film samples per the IEC 61189-2-712 standard. Each film sample was inserted between two fixed dielectric resonators. The resonance frequency and quality factor of the posts are influenced by the presence of the specimen, and this enables the direct computation of complex permittivity (dielectric constant and dielectric loss). The geometry of the SPDR fixture used in our measurements was built at and purchased from QWED in Warsaw, Poland, in collaboration with the Warsaw University of Technology under Professor Jerzy Krupka. The SPDRs operate with the TE01delta mode, which has only an azimuthal electric field component that remains continuous on the dielectric interfaces. The split post dielectric resonator measures the permittivity within the plane of the specimen. Loop coupling (critically coupled) was used in each of these dielectric resonator measurements. Each SPDR measurement system was combined with Keysight VNA (Vector Network Analyzer Model PNA 8364 C 10 MHz-50 GHz). Computations were performed with the commercial analysis software built by Professor Jerzy Krupka and facilitated by Keysight's N1500A dielectric measurement software suite.

Millimeter-Wave Transmissivity Using Free-Space Quasi-Optical Systems

Free-space transmissivity was measured using a free-space quasi-optical (QO) system from Thomas Keating Instruments. The QO system illuminates the sample with a quasi-far-field plane wave at normal incidence between 22-33 GHz, and the plane wave is polarized with a diffraction-limited Gaussian-symmetric intensity profile. The incoming/outgoing waves are launched/received via copper corrugated conical horn antennas, which have a straight-mouth opening to limit sidelobes. The sample diameter is 150 mm, which is oversized to avoid fringing, and the sample thicknesses for this test were 0.5 mm. The QO system consists of four focusing mirrors, two on either side of the sample, and the system is forward/backward symmetric, such that for the measured S-parameter voltages, S11=S22 and S21=S12. The QO system's response is calibrated via the thru-reflect-line (TRL) method, and despite a 3 ns-wide temporal response, a loose 10 ns time gate is applied to avoid undersampling the desired spectral range. The QO system is combined with a Keysight VNA (Vector Network Analyzer N5290A PNA with 110 GHz millimeter-wave frequency extension). Data collection and computations were performed using Keysight's N1500A commercial measurement software suite.

Example 4—Metallized PET Passive Radiative Cooling Film (PRCF3)

PET film available from Tekra (New Berlin, WI, USA) under the tradename Melinex ST504 was vapor coated with 110 nm of Ag followed by vapor coating 20 nm of Cu on top of the 110 nm layer of Ag. The resulting broadband solar mirror film was measured with a Lambda spectrophotometer to have an average reflectivity of 92% over a wavelength range of 400 nm to 2500 nm. A cross-linked acrylic hard coat containing UV absorbers as described in U.S. Pat. No. 10,072,173 was then coated onto the PET film at a thickness of 15 microns to provide UV protection and scratch resistance resulting in a passive radiative cooling film (PRCF3). A layer of acrylic adhesive was then coated onto the PET film on the opposite side of the cross-linked acrylic hard coat UV absorbing layer for adhering PRCF3 to substrates such as aluminum sheets and aluminum finned heat sinks.

Example 5—Metallized PMMA Passive Radiative Cooling Film (PRCF4)

Acrylloy PMMA film available from Spartech (Maryland Heights, MO, USA) under the tradename Acrylloy was vapor coated with 100 nm of Ag followed by vapor coating with 20 nm of Cu on top of the 100 nm layer of Ag. The resulting broadband solar mirror film (PRCF4) was measured with a Lambda spectrophotometer to have an average reflectivity of 93% over a wavelength range of 400 nm to 2500 nm. A 25 micron thick layer of acrylic adhesive was then coated onto the PMMA film for adhering PRCF4 to substrates such as aluminum sheets and aluminum finned heat sinks.

Example 6—Metallized Passive Radiative Cooling Film (PRCF3) Applied to RF Antenna Heat Sink Fins Two aluminum heat sinks with heat aluminum heat dissipation fins were fabricated as shown in Image 1. Two aluminum heat sink bases were fabricated with 0.25" thick aluminum plate having dimensions of 12"×12"×0.25". Slots measuring 0.25" wide×12" long were machined into the top surfaces of the aluminum plates spaced apart by 0.25". Aluminum fins measuring 0.25" thick by 2" tall by 12" were fabricated and pressed into the aluminum heat sink base as shown in Image 1. A 700 W flexible blanket heater available from Watlow was placed under each aluminum heat sink base and above sheets of 1"×14"×14" Styrofoam. PRCF3 as described in Example 4 was laminated to the aluminum heat sink fins and base with pressure sensitive adhesive as shown in Image 2. Both aluminum heat sink fin prototypes were heated to a temperature 15 C above ambient air temperature with the Watlow blank heaters. Under direct solar exposure irradiance of 800 W/m2, prototype 1 required 100 W/m2 to maintain a temperature of 15 C above ambient whereas prototype 2 with PRCF3 required 276 W/m2 to maintain a temperature of 15 C above ambient temperature. On average over a 24 hr period, prototype 1 required 178 W/m2 to maintain a temperature of 15 C above ambient whereas prototype 2 with PRCF3 required 308 W/m2 to maintain a temperature of 15 C above ambient temperature. The differences in power required to maintain above ambient temperature of the bare aluminum heat sink fins versus the PRCF covered aluminum heat sink fins is due to higher solar energy absorbed by aluminum versus solar energy absorbed by PRCF.

Example 7—Metallized Passive Radiative Cooling Film (PRCF4) Applied to RF Antenna Heat Sink Fins Two aluminum heat sinks with heat aluminum heat dissipation fins were fabricated as shown in Image 1. Two aluminum heat sink bases were fabricated with 0.25" thick aluminum plate having dimensions of 12"×12"×0.25". Slots measuring 0.25" wide×12" long were machined into the top surfaces of the aluminum plates spaced apart by 0.25". Aluminum fins measuring 0.25" thick by 2" tall by 12" were fabricated and pressed into the aluminum heat sink base as shown in Image 1. A 700 W flexible blanket heater available from Watlow was placed under each aluminum heat sink base and above sheets of 1"×14"×14" Styrofoam. PRCF4 as described in Example 5 was laminated to the aluminum heat sink fins and base with pressure sensitive adhesive as shown in Image 2. Both aluminum heat sink fin prototypes were heated to a temperature 15 C above ambient air temperature with the Watlow blank heaters. Under direct solar exposure irradiance of 800 W/m2, prototype 1 required 100 W/m2 to maintain a temperature of 15 C above ambient whereas prototype 2 with PRCF4 required 268 W/m2 to maintain a temperature of 15 C above ambient temperature. On average over a 24 hr period, prototype 1 required 178 W/m2 to maintain a temperature of 15 C above ambient whereas prototype 2 with PRCF4 required 297 W/m2 to maintain a temperature of 15 C above ambient temperature. The differences in power required to maintain above ambient temperature of the bare aluminum heat sink fins versus the PRCF covered aluminum heat sink fins is due to higher solar energy absorbed by aluminum versus solar energy absorbed by PRCF.

The invention claimed is:

1. A cooling film assembly comprising:

a cooling film shaped into a self-supporting three-dimensional structure comprising a plurality of fins, wherein the cooling film comprises:

a reflective microporous layer having opposed first and second major surfaces, wherein the reflective microporous layer is reflective of electromagnetic radiation over a majority of wavelengths in the range of 400 to 2500 nanometers; and an antisoiling layer secured to the first major surface of the reflective microporous layer, the antisoiling layer having an outwardly facing antisoiling surface opposite the reflective microporous layer, and a thermally conductive material disposed inside of the plurality of cavities, wherein the thermally conductive material comprises one or more of: metal, aluminum oxide, boron nitride, graphene particles, metal-coated glass beads, and metal-coated glass fibers.

2. The cooling film of claim 1, wherein the film is transmissive to radio frequency wavelengths in a range from 1.1 to 33.6 GHz.

3. The cooling film of claim 2, wherein the film transmits at least 96% of power over a range from 22 to 33 GHz.

4. The cooling film of claim 1, wherein the reflective microporous layer is diffusely reflective of electromagnetic radiation over a majority of wavelengths in the range of 400 to 2500 nanometers.

5. A cooling film assembly, comprising:

a cooling film comprising solar reflective multilayer film, wherein the solar reflective multilayer is specularly reflective of electromagnetic radiation over a majority of wavelengths in the range of 400 to 2000 nanometers, and an antisoiling layer secured to a first major surface of the solar reflective multilayer film, the antisoiling layer having an outwardly facing antisoiling surface opposite the first major surface, and the film is shaped into a self-supporting three dimensional structure, wherein the self-supporting three-dimensional structure comprises a plurality of fins; and a thermally conductive material disposed inside of the plurality of fins, the thermally conductive material comprising one or more of: metal, aluminum oxide, boron nitride, graphene particles, metal-coated glass beads, and metal-coated glass fibers.

6. The assembly of claim 5, further comprising an optional metallized infrared-reflective layer secured to a second major surface of the solar reflective multilayer film.

* * * * *